United States Patent

Przybylla

[11] 3,981,428
[45] Sept. 21, 1976

[54] METHOD FOR CRACK-FREE JOINING OF TUBES FOR A WEARING INSERT FOR SCREW CONVEYORS

[75] Inventor: Fritz Przybylla, Heilbronn, Germany

[73] Assignee: Werner & Pfleiderer, Stuttgart, Germany

[22] Filed: Dec. 15, 1975

[21] Appl. No.: 640,853

[30] Foreign Application Priority Data
Dec. 20, 1974 Germany............................ 2460316

[52] U.S. Cl................................. 228/175; 138/171; 198/625
[51] Int. Cl.² .......................................... B23K 1/14
[58] Field of Search.................... 228/175, 187, 184; 138/171; 198/213

[56] References Cited
UNITED STATES PATENTS

| | | | |
|---|---|---|---|
| 3,002,265 | 10/1961 | Stalker............................ | 228/175 X |
| 3,010,151 | 11/1961 | Dickinson et al................... | 138/171 |
| 3,910,316 | 10/1975 | Reifenhauser...................... | 138/171 |

Primary Examiner—Al Lawrence Smith
Assistant Examiner—K. J. Ramsey
Attorney, Agent, or Firm—Browdy and Neimark

[57] ABSTRACT

Improved joining of tubes for plural-screw screw extruders is achieved by using solder to join the tubes and applying the heat in the vicinity of a saddle from the inside of the tubes and symmetrically with respect to the saddle.

8 Claims, 2 Drawing Figures

U.S. Patent  Sept. 21, 1976  3,981,428
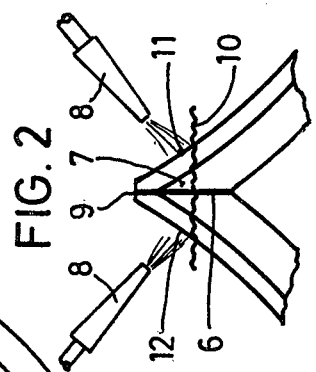
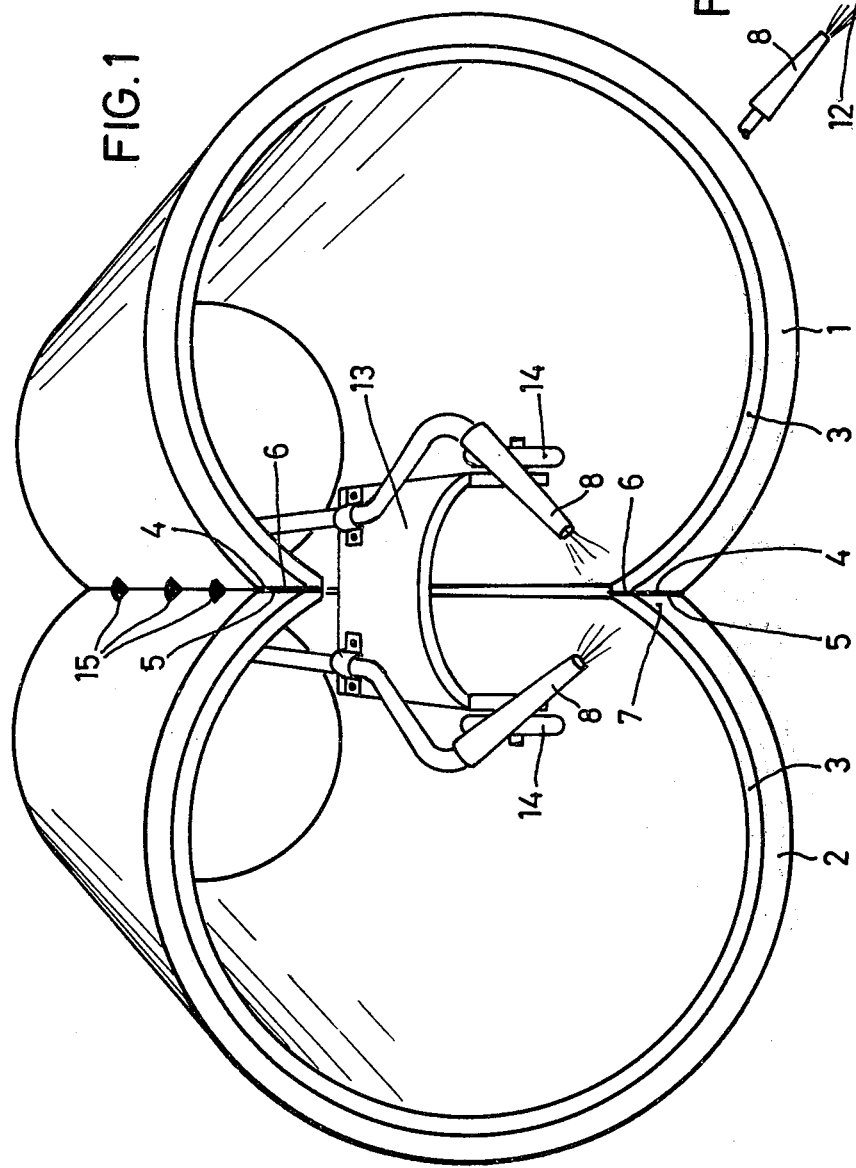

METHOD FOR CRACK-FREE JOINING OF TUBES FOR A WEARING INSERT FOR SCREW CONVEYORS

FIELD OF THE INVENTION

The invention relates to the joining of tubes and, more particularly, to a method for crack-free joining of tubes cut along secants and having the secant surfaces abutting one another to form relatively pointed saddles with the application of heat and additional products such as solder, such tubes being provided internally with a wearing coating and serving as a wearing insert for housings of plural-screw screw conveyors or extruders.

BACKGROUND

German Offenlegungsschrift 1,729,345 relates to a method in which the joint between such tubes is produced by welding the two tubes from the outside in the vicinity of the adjacent abutting surfaces (secant surfaces). In this method, it is impossible to avoid formation of a crack in the internal saddle area of the abutting tube sections due to the thermal expansion and stress developing during welding, so that during use of the extruder so made, material to be processed, especially thermoplastic, can enter such a crack, such thermoplastic material decomposing with time and then contaminating the material to be processed.

In addition, the presence of such a crack leads to premature wear of the edges in the area of the saddle. To eliminate these problems, German Offenlegungsschrift 1,729,345 also teaches the lengthwise division of the housing of the screw conveyor, insertion of tube segments serving as liners, and compressing them with tensioning screws joining the parts of the housing. However, this is an unsatisfactory solution. Adequate tensioning results in elastic and (under certain conditions) even residual deformations in the vicinity of the saddle points, i.e., especially in the wearing coating which serves for protection. In addition, cracks may result in the area of the abutting surfaces, into which the softened plastic can penetrate.

German Offenlegungsschrift 2,231,046 teaches the use of a wearing insert made of two tubes welded together along their milled abutting surfaces (secant surfaces), wherein the tubes are provided with recesses on the outside along the butt seams, the recesses alternating with smooth stamped surfaces, wherein the welded seams joining the tubes are provided only in the area of the recesses. By this means, it is intended that the abutting surfaces be so close together that none of the material being processed in the screw conveyor can penetrate between the abutting surfaces. However, here again it is unavoidable that aggressive gases or condensates from the molten plastic can enter the crack between the abutting surfaces and corrode the surfaces. In addition, this method of manufacture is extremely costly.

U.S. Pat. No. 3,010,151 proposes the utilization of two tubes cut along the secants and joined with the secant surfaces (abutting surfaces) to form relatively pointed saddles, the tubes being provided on the inside with a wearing coating and also provided on the outside with a through recess in the area of the abutting surfaces, with the tubes being welded together in this recess. A thin layer of inert metal is soldered onto the welded seam and the remainder of the recess is then potted with lead. The solder layer of inert metal (which can be silver, gold, tin, copper, or the like) serves to prevent the aggressive components of the material being processed in the screw conveyor from penetrating through the crack between the abutting surfaces, and then reaching the housing of the screw conveyor and causing corrosion therein. However, this procedure is difficult and costly, requiring a great expenditure of work; furthermore, even this complex procedure has not been sufficiently successful since aggressive materials from within still have a tendency to penetrate between the adjoining parts causing corrosion and ultimately destruction, as well as contamination of the material being processed.

SUMMARY

An object of the present invention is to overcome the defects of the prior art, such as mentioned above; another object is to improve a method of the type described above in such manner that the formation of a crack between the secant surfaces (abutting surfaces) in the vicinity of the saddle can be reliably prevented at low cost; a further object is to provide improved housings for plural-screw screw extruders or conveyors.

These goals are achieved according to the invention by using solder to join the tubes and applying the heat in the vicinity of a saddle from the inside of the tubes and symmetrically with respect to the saddle. The type of heat application provided according to the invention ensures that the heating in the area of the saddle points proceeds more rapidly than in the areas of the abutting surfaces located farther outward (secant surfaces). This counteracts a gaping apart of the abutting surfaces in the vicinity of the saddle points (i.e. a widening of the crack).

Since the heat is applied through the wearing coating, the temperature of such coating is higher than the temperature of the outside tube, thus ensuring a reduction of the crack size. This is reinforced further by the bimetallic effect, since the high-carbon steels generally employed for wearing coatings usually have higher coefficients of thermal expansion than the structural or mild steel normally used for the tubes themselves. Heating proceeds very rapidly because only relatively small masses need be heated when the heat is applied from the inside and only small heat loss cross sections are present in the vicinity of the saddle. Since only small cross sections are heated and since the high carbon steel coating is heated from the inside, it is primarily compressive strains which are produced, thus minimizing the danger of crack formation in the wearing coating.

In addition, the wearing insert warps in this welding process sufficiently slightly that the tubes remain within preset tolerance limits. This ensures that the entire crack between the abutting surfaces of the two tubes cut along the secants is filled with solder, i.e., is completely sealed. This can be accomplished in particularly simple fashion if the solder is inserted in the form of a film in the soldering crack between the secant surfaces.

It has been found that the results are optimal when heat application occurs a short distance below the saddle point, i.e., approximately 10–20 mm below the saddle point, with heat application proceeding sufficiently rapidly that only a small area of the wearing coating is significantly heated. This ensures that no spreading of the crack can occur on cooling before the solder has cooled adequately, so that the tensile stresses which occur during cooling and are directed vertically to the welded seam are always less than the strength of the soldered joint. It has been found advantageous to use solders with a high palladium content, since these are relatively temperature resistant, i.e., they exhibit a high strength during cooling when temperatures are still relatively high. In addition, wearing inserts joined in such manner can be inserted even at high operating temperatures above 300°C. The relatively high price of palladium is not a factor due to the extremely small amounts required.

BRIEF DESCRIPTION OF DRAWING

Further advantages and features of the invention will follow from the description of an embodiment with reference to the drawing, wherein:

FIG. 1 illustrates an embodiment of the process in which twin tubes having a wearing insert are joined, shown in perspective; and FIG. 2 is a broken away view of a saddle of the wearing insert, enlarged.

DETAILED DESCRIPTION OF THE EMBODIMENT

Two tubes 1 and 2, made of conventional mild steel, are provided on their inside walls with a wearing coating 3, for example of high carbon steel, the coating being applied in the conventional manner, for example by centrifuging. The thickness of the wearing coating, which normally also serves for corrosion protection, is a function of the operational requirements. The two cylindrical tubes 1 and 2, with the same diameter, after the inside wearing coating 3 has been applied, are cut along the secants and joined along the secant surfaces forming abutting surfaces 4 and 5.

In advance of such joining, solder 6 in the form of a film or strip is inserted between secant surfaces 4 and 5. Then the two tubes 1 and 2 are pressed together in such manner that the solder film 6 is held firmly between the secant surfaces (abutting surfaces) 4 and 5. The insides of the so-called saddles 7 are then heated very rapidly be means of two burners 8 directed symmetrically on the saddle at a distance of 10–20 mm below the saddle point 9, i.e., approximately halfway along the crack delimited by secant surfaces 4 and 5, with intensive heat application.

Since the heat loss cross section indicated in FIG. 2 by a wavy line 10 is comparatively small, and since the distance of the crack delimited by secant surfaces 4 and 5 from heat application points 11 and 12 is relatively short, the solder 6 in the crack is heated very rapidly and melts, i.e., this melting process occurs over a time during which only small areas of the tubes 1 and 2 and the wearing coating 3 associated therewith are heated. When local heat application is completed, the molten solder 6 immediately cools off, so that there is no danger of separation of the welded joint despite unavoidable tensile stresses in the vicinity of saddle 7, and especially in the area of saddle point 9.

Heat application is accomplished advantageously be means of a so-called fork burner. The two burners 8 may be mounted on a carriage 13, whose wheels 14 can travel along the inside of the tubes 1 and 2 on the wearing coating 3 lengthwise straddling the crack delimited by secant surfaces 4 and 5, so that the position of burner 8 relative to saddle 7 is constant during the entire continuous welding process. In this way, constant heating conditions can be ensured in simple fashion.

The solder can also be applied to the crack delimiting secant surfaces 4 and 5 such that it lies on the saddle points 9 and is drawn into the crack by capillary action. In this case, however, a crack width of approximately 1/10 mm must be provided, which may be more costly from the manufacturing technology standpoint. Instead of using a tensioning device to press the two tubes together when using a strip type solder 6, as shown in FIG. 1 above, the two secant-shaped tubes 1 and 2 may be tacked together by means of tack welds 15 on the outside.

The wearing insert prepared in the manner described above is inserted in the housing of a screw conveyor, i.e., a screw-type extruding press, provided with bores corresponding with the outside profile of the wearing insert.

It will be obvious to those skilled in the art that various changes may be made without departing from the scope of the invention and the invention is not to be considered limited to that is show in the drawings and described in the specification. It will, for example, be understood that while a twin-screw wearing insert is illustrated, the invention is also applicable to wearing inserts for three, four or more screw screw extruders and conveyors.

What is claimed is:

1. A method for crack-free joining of tubes cut along secants and pressed together along the secant surfaces to form relatively pointed saddles with application of heat and additional products, said tubes being provided on the inside with a wearing coating, said tubes serving as a wearing insert for housing of plural-screw screw conveyors, the method comprising:
    joining the tubes lengthwise with solder being used as the additional product and by the heat being provided in the area of a saddle from the inside of the tubes and symmetrically with respect to the saddle.

2. Method according to claim 1, wherein the heat is applied approximately halfway up the crack delimited by the secant surfaces.

3. Method according to claim 1, wherein the heat application is intense and is applied in a very short time.

4. Method according to claim 1, wherein the solder is applied in the form of a strip between the secant surfaces.

5. Method according to claim 1, wherein said solder is a high-palladium-content solder.

6. Method according to claim 1 wherein said tubes are further joined together with tack welds on the outside of the tubes along the crack delimited by the secant surfaces.

7. Method according to claim 1, wherein said wearing coating is formed of metal having a higher coefficient of thermal expansion than the metal of said tubes.

8. Wearing insert manufactured according to the method of claim 1.

* * * * *